United States Patent
Bosch et al.

(10) Patent No.: US 7,511,439 B2
(45) Date of Patent: Mar. 31, 2009

(54) METHOD FOR STARTING A SENSORLESS, ELECTRONICALLY COMMUTATABLE DIRECT CURRENT MOTOR

(75) Inventors: Volker Bosch, Leinfeden-Echterdingen (DE); Bernd Wirnitzer, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/593,184

(22) PCT Filed: Feb. 4, 2005

(86) PCT No.: PCT/EP2005/050480
§ 371 (c)(1), (2), (4) Date: Apr. 13, 2007

(87) PCT Pub. No.: WO2005/091489
PCT Pub. Date: Sep. 29, 2005

(65) Prior Publication Data
US 2007/0210732 A1  Sep. 13, 2007

(30) Foreign Application Priority Data
Mar. 18, 2004 (DE) .................. 10 2004 013 241

(51) Int. Cl.
*H02P 25/08* (2006.01)
(52) U.S. Cl. .............. 318/254.1; 318/445; 318/719
(58) Field of Classification Search ............ 318/101, 318/103, 34, 254, 445, 719
See application file for complete search history.

(56) References Cited
U.S. PATENT DOCUMENTS
4,912,378 A    3/1990    Vukosavic
5,117,165 A    5/1992    Cassat et al.
5,841,252 A *  11/1998   Dunfield ............. 318/400.32
6,204,617 B1 * 3/2001    Van Hout et al. ...... 318/400.32

(Continued)

FOREIGN PATENT DOCUMENTS
DE    101 62 380 A1    7/2003

OTHER PUBLICATIONS
T. Noguchi et al., "Mechanical-sensorless permanent-magnet motor drive using relative phase information of harmonic currents caused by frequency-modulated three-phase PWM carriers", IEEE Transactions on Industry Application, Jul. 2003, pp. 1085-1092, vol. 39, Issue 4, U.S.A.

(Continued)

*Primary Examiner*—Bentsu Ro
*Assistant Examiner*—David S Luo
(74) *Attorney, Agent, or Firm*—Ronald E. Greigg

(57) ABSTRACT

A method for starting a sensorless, electronically commutatable direct current motor, having a permanent-magnetically excited rotor in which the stator carries a three-phase stator winding, whose regulated supply of current from a direct voltage source is already made possible from the standstill state. To that end, by the control device used, at rotor standstill and at the onset of the startup operation in the range below a minimum value of the rotor rpm, first the position of the rotor is ascertained, and then via the switching device, a regulated initial supply of current to the phase windings of the stator is generated, while after the predetermined minimum value of the rotor rpm is attained, the control device receives position signals as rotor position signals for a self-commutation of the motor, which signals are derived directly from the third and/or further odd-numbered harmonics of the phase voltages, and from these position signals furnishes control signals to the switching device for supplying current to the phase windings in normal operation.

16 Claims, 2 Drawing Sheets

U.S. PATENT DOCUMENTS

| | | | |
|---|---|---|---|
| 6,441,572 B2 * | 8/2002 | Batzel | 318/400.33 |
| 6,541,936 B2 * | 4/2003 | Viti | 318/727 |
| 6,885,163 B2 * | 4/2005 | Heidrich | 318/400.11 |
| 7,180,263 B2 * | 2/2007 | Maeda et al. | 318/719 |
| 2001/0030517 A1 | 10/2001 | Batzel | |
| 2004/0056629 A1 * | 3/2004 | Maeda et al. | 318/719 |
| 2004/0113576 A1 * | 6/2004 | Heidrich | 318/445 |

OTHER PUBLICATIONS

Y. Jeong et al., "Initial rotor position estimation of an interior permanent-magnet synchronous machine using carrier-frequency injection methods", IEEE International Electric Machines and Drives Conference, Jun. 2003, pp. 1218-1223, vol. 2, U.S.A.

* cited by examiner

METHOD FOR STARTING A SENSORLESS, ELECTRONICALLY COMMUTATABLE DIRECT CURRENT MOTOR

CROSS-REFERENCE TO RELATED APPLICATION

This application is a 35 USC 371 application of PCT/EP 2005/050480 filed on Feb. 4, 2005.

BACKGROUND OF THE INVENTION

1. Field of the Invention

The invention relates to a method for starting a sensorless, electronically commutatable direct current motor.

2. Description of the Prior Art

One method of starting electronically commutated direct current motors is known for instance from the dissertation D 93 by Volker Bosch at the University of Stuttgart, entitled "Elektronisch kommutiertes Einzelspindelantriebssystem" [Electronically Commutated Single-Spindle Drive System], Shaker Verlag, Aachen, 2001. In such electronically commuted direct current motors, which do not detect the rotor position via sensors, the absolute position of the rotor at a standstill is not known. For initial positioning of the motor, the rotor is therefore first put in a predetermined outset position at the onset of the startup operation, which is done by supplying two or three phases of the motor with current, so that the rotor aligns itself accordingly. After a defined waiting period, a controlled startup of the motor then takes place by incremental delivery of current to further phases of the motor. The method for sensorless rotor position detection described in the aforementioned publication, however, on principle furnishes a reliable position signal only above a predetermined minimum rpm of the rotor, and this method can therefore not be used directly for starting the motor. The motor startup is thus done in a controlled way rather than regulated; that is, blocking of the rotor cannot be immediately detected and corrected. For motors with variable loading, this known method is therefore only conditionally suitable.

OBJECTS AND SUMMARY OF THE INVENTION

A primary object of the invention is to improve the known method in such a way that with the least possible engineering effort and expense, the startup of such a motor with sensorless rotor position detection can also be done in a regulated way, with the duration and amount of the supply of starting current being adaptable to the particular load on the motor. Besides rapid detection of blocking of the motor, a reliable startup under heavy load, or startup of the motor at low load, should be attained in the shortest possible time.

In accordance with the invention, it is now possible, by sensorless position detection of the rotor already at a standstill, to attain a reliable, load-dependent regulation of the startup operation of the motor, and furthermore, once a predetermined minimum value of the rotor rpm is exceeded, to employ an advantageous different kind of speed governing of the motor by means of evaluating the third and/or further odd-numbered harmonics of the phase voltages. For ascertaining the position of the rotor at a standstill, recourse may be had to a method known from German Patent Disclosure DE 101 62 380 A1, with which a preliminary delivery of current for rotating the rotor into a defined outset position is unnecessary. After the startup of the machine and especially at high rpm, however, this known method becomes very complex and requires a very high-powered, fast computer for ascertaining the current rotor position at the time, knowledge of which is necessary for the regulation.

Beyond a certain minimum rpm of the rotor of the machine, sensorless rotor position detection can advantageously be employed on the basis of detecting the third harmonic, in the way fundamentally described in European Patent Disclosure EP 735 663 B1 or in the aforementioned dissertation D 93 at the University of Stuttgart. By means of a suitable combination of the two methods, known per se but based on very different findings and methods, with a novel startup control, it becomes possible to create a reliable, economical regulation of a sensorless, electronically commutatable direct current motor, in which in accordance with the stated object a regulated start from a standstill and an expedient regulation of the motor in normal operation are attained.

It has proved to be especially advantageous for the implementation of the method in terms of circuitry if, after the resting position of the rotor has been ascertained, the zero voltage signal of the machine, picked up and integrated from the third and/or further odd-numbered harmonics of the phase voltages on the one hand via a star point of the stator windings and on the other via an auxiliary star point formed of three phase windings, on the one hand at a standstill and at the onset of the startup operation of the motor via an A/D converter and on the other in the range above a predetermined minimum value of the rotor rpm, are delivered to the control device for the switching device of the motor via a comparator with hysteresis. Thus with an economical computer, both a simple position determination of the rotor at a standstill, with the possibility of load-dependent dimensioning and regulation of the startup current of the motor, is attained on the one hand, and on the other, the possibility is attained of regulating regulate the machine in normal operation, without the requisite high computation expenditure for the applicable determining of the rotor position at high rpm.

The nucleus of the control device is a microcontroller, to which on the one hand the output signals of a comparator for determining the position of the rotor at a standstill and on the other the output signals of an integrator for speed governing upon startup and in normal operation are delivered. Via the outputs of the microcontroller of the control device, the commutation and control of the phase currents is done, in a fundamentally known way, by means of a fall-bridge inverter circuit constructed with MOSFET transistors, which circuit is operated via an associated transistor driver with pulse width modulation.

BRIEF DESCRIPTION OF THE DRAWINGS

Further details an advantageous features of the method of the invention will become apparent from the description of the exemplary embodiment contained herein below, taken in conjunction with the drawings, in which.

DESCRIPTION OF THE PREFERRED EMBODIMENT

Figure 1:
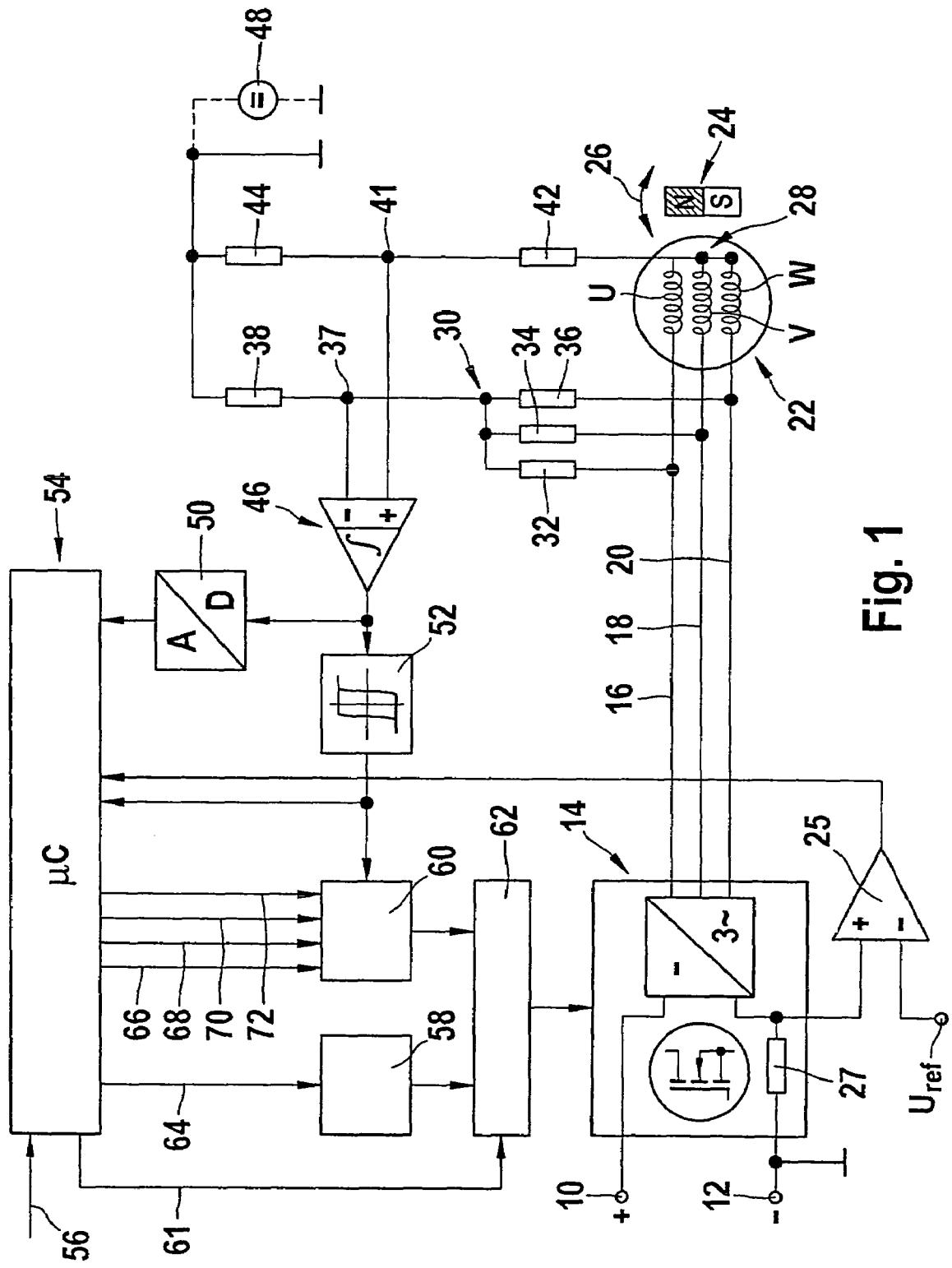
FIG. 1 shows a three-phase, sensorless, electronically commutatable direct current motor with a permanent-magnetically excited rotor.

In FIG. 1, 10 designates the positive pole and 12 the negative pole, connected to ground, of a direct voltage source, which supplies an inverter 14 constructed as a six-pulse converter bridge with MOSFET transistors. The outputs of the inverter are connected via leads 16, 18, 20 to the phase windings U, V, W of the stator 22 of a sensorless, electronically commutatable direct current motor, whose permanent-magnetically excited rotor is shown at 24. A double arrow 26 at the rotor 24 indicates that the rotor can be driven in opposite directions of rotation.

Via a further output of the inverter 14, the current in the direct voltage circuit, upon the imposition of current pulses on the phase windings U, V, W, is delivered to a measuring shunt 27, connected to ground, for ascertaining the rotor position at standstill of the machine. The voltage drop at the shunt 27 is compared in a comparator 25 with a reference voltage $U_{ref}$, and the output signal of the comparator 25 is delivered, for ascertaining the rotor standstill position, to a control device 54, where in accordance with the fastest current rise in the phase windings U, V, W, resulting from the position of the rotor, the rotor position can be determined. This method is described in detail in DE 101 62 380 A1, the discussions in which are incorporated by reference.

The phase windings U, V, W are connected together to a star point 28; a further star point 30 is formed by means of three phase resistors 32, 34, 36, the ends of which are on the one hand connected together to the star point 30 and on the other are connected by the leads 16, 18, 20 to the phase windings U, V, W. Moreover, the phase resistors 32, 34 and 36, together with a resistor 38, form a first voltage divider, which is connected to ground and whose tap 37 is connected to the negative input of an operational amplifier that is wired as an integrator 46. The positive input of the integrator 46 is located at the tap 41 of a voltage divider formed of two resistors 42 and 44; the end of the resistor 44 remote from the tap 41 is connected jointly with the corresponding end of the resistor 38 to ground. The integrator 46 is constructed in one piece of an operation amplifier. With regard to the base point of the voltage divider connected to the two star points 28 and 30, it may be necessary for the joined- together ends of the resistors 38 and 44 to be connected to an auxiliary voltage source 48, shown in dashed lines, which if a unipolar voltage source is employed furnishes the resting signal for the position detection.

The output of the integrator 46 is connected to a microcontroller (μC) of the control device 54, on the one hand via an A/D converter 50 and on the other via a comparator 52 with hysteresis. The microcontroller is supplied at further inputs with a signal 56 for the rated rpm of the machine as well as the output signal of the comparator 25. The outputs of the microcontroller are connected via a pulse width modulator 58, an up/down counter 60, and an enabling connection 61, to a transistor driver 62 for the inverter 14. The up/down counter 60 is moreover also connected to the output of the comparator 52. From the microcontroller of the control device 54, the up/down counter 60 receives signals about the rotor starting position, a charge signal, an enable signal, and a signal for the up and down counting, depending on the desired clockwise or counterclockwise rotation of the motor. All the connecting lines are represented by single lines; the actual number of lines for the individual connections is designated in each case by a reference number. The lead to the pulse width modulator 58 is marked 64; the lead to the counter 60 for the rotor starting position is marked 66; the lead for charging the counter is marked 68; the lead for the enabling of the counter is marked at 70; and the lead for the clockwise and counterclockwise rotation is marked 72.

The method of the invention for starting a sensorless, electronically commutatable direct current motor with a permanent-magnetically excited rotor functions as follows:

Before starting of the motor, first the current position at a standstill is ascertained, by means of the measurement shunt 27, a reference voltage $U_{ref}$, the comparator 25, and the microcontroller μC. One method suitable for this is described for instance in DE 101 62 380 A1. In it, first a plurality of brief current pulses is imposed via the inverter 14 on the phase windings U, V, W; upon each current pulse, a current rise occurs in the stator windings, whose rise speed is dependent on the position of the rotor 24. The times until a predetermined threshold is reached are measured at the comparator 25. A plurality of test current pulses is imposed in succession on the stator windings in such a way that the test current pulses generate stator magnetomotive force vectors in the stator that are offset by equal angular intervals over the course of 360° (el.). For each stator magnetomotive force vector, the current rise time in the direct voltage circuit being supplied is measured, and the phase relationship of the stator magnetomotive force vector having the shortest current rise time defines the rotor position. In detail, this method suitable for determining the standstill position of the rotor is described in detail in the aforementioned published reference and need not be described at length again here.

After the rotor position has been determined and before the motor is started, the up/down counter 60 is acted upon, by the microcontroller of the control device 54, by a starting value which corresponds to the previously ascertained rotor starting position. The further method for starting the machine and governing its speed is then based on a method for sensorless rotor position detection by evaluation of the third and/or further odd-numbered harmonics of the phase voltages of the motor. Because of the non-sinusoidal field distribution in the air gap, these phase voltages have harmonics, and because the exciter field distribution is symmetrical relative to the pole center, only the odd-numbered harmonics occur. Because of the trapezoidal to square wave course of the air gap flux density, the third harmonic of the flux density, which then also appears as a third harmonic in the phase voltages, has a considerable magnitude, while the remaining harmonics can as a rule be ignored here.

As a result of the star connection of the phase windings U, V, W, no third current harmonics occur in the individual windings, since the third harmonics induced in all three phases are equal in both phase and amount. The third harmonics thus form a zero system, which results readily from the voltage difference between the star point 28 of the phase windings and an artificial star point, formed by the three phase resistors 32, 34, 36, since this artificial star point 30 does not simulate a zero voltage system.

For starting the motor, the voltage difference between the two star points 28 and 30 is first ascertained, by applying the two star point voltages, via the taps 37 and 41 of voltage dividers having the parallel-connected phase resistors 32, 34, 36 and the resistor 38, or the resistors 42 and 44, to the inputs of the integrating differential amplifier 46. The tap 37 of the voltage divider at the star point 28 of the phase windings is connected to the positive input, and the tap 41 at the voltage divider of the resistor star point 30 is connected to the negative input of the integrator 46. The two star point voltages are referred to ground potential via the voltage dividers.

The differential signal at the inputs of the integrator 46 is a purely alternating voltage; the amplitude of the differential signal is proportional to the amplitude of the pole wheel voltage. Since that increases with increasing motor rpm, the operational amplifier used is wired as an integrator 46, to avoid overamplification. The two functions of the operational amplifier form an integrator 46 with differential inputs; at the output of the integrator 46, a voltage of constant amplitude is generated. A phase displacement of the output voltage of the integrator 46 compares to its input voltage also results, such that the chronological location of the zero crossovers at the output of the integrator 46 correspond to the extreme values of the third harmonic and thus to the commutation times of the inverter 14.

Figure 2:
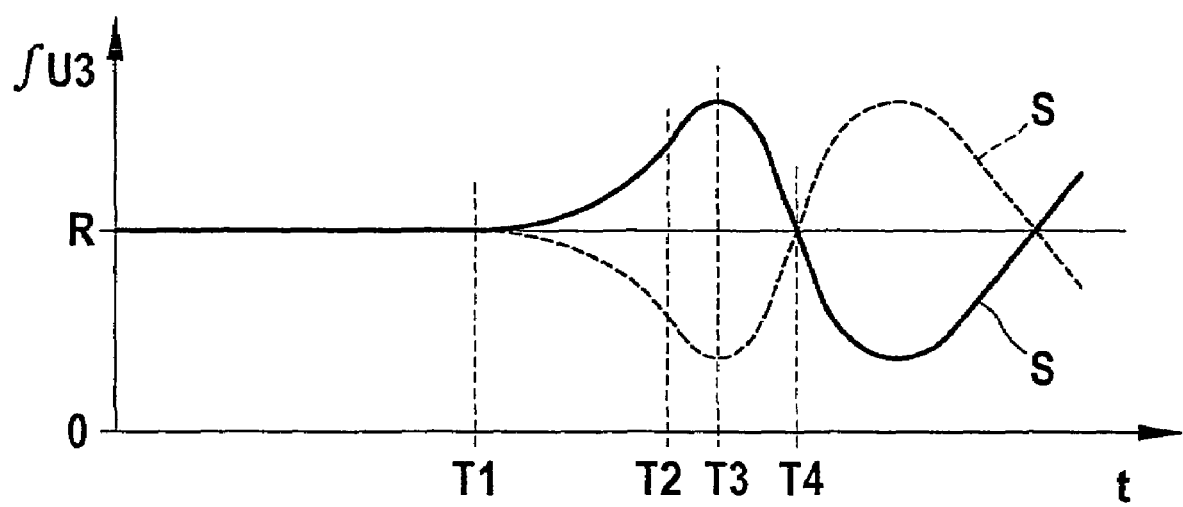
FIG. 2 shows the basic course over time of the integrated analog rotor position signal during the startup.

FIG. 2 shows the basic course over time of the analog position signal ∫U3 during the startup operation. At time T1, this is a resting signal. At time T1, the rotor 24 begins to move, but only approximately at time T2 does the square-wave output signal of the comparator 52 that functions with hysteresis furnish usable position information. The curve shape with the turning point at T2, the subsequent maximum or minimum, or an absolute value of the signal may be used for ascertaining continuous position information. The curve shown in dashed lines in FIG. 2 indicates that depending on the outset position of the rotor 24, the signal can either rise after the start of the motor, as indicated by the solid line, or fall, as indicated by the dashed line; the dashed line represents a mirroring at the straight line as a result of the resting value of the signal.

The rotor position signal at the output of the integrator 46 is simultaneously delivered to both the comparator 52 that functions with hysteresis and the A/D converter 50. At the output of the integrator 46, an analog rotor position signal ∫U3, which in a first approximation is sinusoidal, is available; via the A/D converter 50, this signal is delivered to the microcontroller µC, so that the control device 54 can detect the value of this signal at an any time. The A/D converter 50 furnishes the microcontroller with the current position signal as an 8-bit value in binary form, and each crossover of the rotor position signal by the resting value (FIG. 2) corresponds to precisely one trailing or leading edge.

The binary signal of the comparator 52 is also applied to the binary up/down counter 60, which counts upward or downward by one value at each edge of the binary position signal. The counter recognizes six states, each corresponding to 60° el. of the position of the rotor 24. The microcontroller of the control device 54, via the lead 70, enables the counter 60, and via the lead 72, it determines the direction of rotation of the motor by means of the upward or downward counting direction. Via the lead 68, the counter 60 receives the signal "charge", whereupon it is initialized with a 3-bit-wide starting value via the lead 66 in accordance with the previously ascertained starting position of the rotor 24. From the up/down counter 60, the six possible counter states are then delivered as a 3-bit datum to the transistor driver 62 for the inverter 14, which from the counter state determines the switch elements that are to be updated. These are preferably MOSFET transistors.

Downstream of the up/down counter 60, the pulse width modulator 58 is also initialized with a starting value by the microcontroller µC, via the lead 64. The control of the switch elements of the inverter 14 is done in accordance with the duty cycle, predetermined by the pulse width modulator 58 via the transistor driver 62, and the motor voltage is predetermined to the pulse width modulator 58 as a binary signal by the microcontroller of the control device 54. The enabling of the transistor driver 62 is done directly by the motor controller via the enabling connection 61. Via the A/D converter 50, the microcontroller now tracks the value of the analog position signal, as is shown in FIG. 2. It increases the motor voltage, delivered to the phase windings U, V, W of the stator 22 from the inverter 14, to above the binary value delivered to the pulse width modulator 58 until such time as the analog position signal at the output of the integrator 46 departs from its resting value, shown in FIG. 2, at time T1. At this time, the holding torque of the motor with the load connected to it is overcome, and the rotor position signal ∫U3 rises, for instance in the form shown in FIG. 2, above its resting level and at time T1 passes for the first time through a turning point; at time T3, it reaches a relative maximum or minimum, and already at time T4 it changes over to a virtually sinusoidal course, corresponding to the third harmonic of the phase voltages. If the analog rotor position signal ∫U3 deviates by a defined value from its resting level R, or in other words if the signal passes through a turning point, then the microcontroller enables the up/down counter 60, so that this counter now automatically counts onward by one increment as a result of each edge of the binary position signal at the output of the comparator 52 and as a result brings about the commutation of the motor current. Next, the speed governing of the motor is done, in accordance with the signal for the rated rpm applied to the microcontroller of the control device 54, by way of the adjusting of the pulse width modulator 58. To that end, the frequency or the period duration of the binary rotor position signal at the output of the comparator 52 is measured out by the microcontroller of the control device 54.

In summary, it can be stated that by means of the method of the invention for starting an electronically commutatable direct current motor, not only is a regulated operation of the motor in the predetermined rpm range achieved in an especially advantageous way, but the startup of the motor can also already be done in a regulated form and monitored for malfunctions. This is made possible because first, before the actual starting operation, the resting position of the rotor is ascertained, which with a rotor at a standstill requires only little computation speed and accordingly a comparatively simple, economical microcontroller µC for the control device 54. By the ensuing targeted supply of current to two of the phase windings U, V, W, in such a way that between the axes of the rotor and stator magnetomotive force an angle between approximately 60° el., and 120° preferably approximately 90° el., the rotor 24 from the standstill experiences the maximum possible accelerating torque. Next, the current in the phrase windings of the stator 22 is increased until such time as the rotor 24 begins to rotate, whereupon the output signal of the integrator 46 departs from its resting level R. If the integrator signal exceeds or drops below a defined limit value, the self-commutation is then enabled by the edges of a binary rotor position. Thus with little expense for ciruitry, by means of the measures taken a load-dependent regulation is achieved without the risk of blocking of the motor of the startup.

The foregoing relates to a preferred exemplary embodiment of the invention, it being understood that other variants and embodiments thereof are possible within the spirit and scope of the invention, the latter being defined by the appended claims.

The invention claimed is:

1. A method for starting a sensorless, electronically commutatable direct current motor, having a permanent-magnetically excited rotor and a stator that carries a multi-phase, in particular three-phase stator winding, as well as having a switching device, controlled by a control device, for supplying current in the correct order to the phase windings of the stator from a direct voltage source, the method comprising at rotor standstill and at the onset of the startup operation in the range below a minimum value of the rotor rpm, first the position of the rotor is ascertained by the control device, and then via the switching device, a regulated initial supply of current to the phase windings of the stator is effected, while after the predetermined minimum value of the rotor rpm is attained, the control device receives position signals as rotor position signals for a self-commutation of the motor, which signals are derived directly from the third and/or further odd-numbered harmonics of the phase voltages, and from these position signals furnishes control signals to the switching device for supplying current to the phase windings in normal operation and further comprising driving the third and/or the further odd-numbered harmonies of the phase voltages of the stator, on the one hand via the star point of the phase windings and on the other via an auxiliary star point, formed of three phase resistors, to a comparator with a downstream integrator.

2. The method as defined by claim 1, wherein the output signal of the integrator, when the motor is at a standstill and at the onset of the startup operation, is delivered to the control device via an A/D converter and in the range above the predetermined minimum value of the rotor rpm via a comparator with hysteresis.

3. The method as defined by claim 2, wherein the control device has a microcontroller, which as input signals receives the signals of an A/D converter, a comparator with hysteresis, and a rated rpm signal, and with its outputs, via a driver stage, it controls a switching device for supplying current to the phase windings of the stator.

4. The method as defined by claim 2, wherein beyond a predeterminable value of the analog rotor position signal furnished by the integrator, between its resting value and an approximately sine-wave oscillation, the enabling of the change from the regulated initial supply of current to the phase windings to the commutation regulation by the flanks of the binary output signal of the comparator with hysteresis is effected, corresponding to the course of the third harmonic of the phase voltages.

5. The method as defined by claim 1, wherein the control device has a microcontroller, which as input signals receives the signals of an A/D converter, a comparator with hysteresis, and a rated rpm signal, and with its outputs, via a driver stage, it controls a switching device for supplying current to the phase windings of the stator.

6. The method as defined by claim 1, wherein the control device, once the predetermined minimum value of the rotor rpm is attained, continuously receives binary position signals for the rotor-position-dependent self-commutation of the motor via the comparator with hysteresis.

7. A method for starting a sensorless, electronically commutatable direct current motor, having a permanent-magnetically excited rotor and a stator that carries a multi-phase, in particular three-phase stator winding, as well as having a switching device, controlled by a control device, for supplying current in the correct order to the phase windings of the stator from a direct voltage source, the method comprising at rotor standstill and at the onset of the startup operation in the range below a minimum value of the rotor rpm, first the position of the rotor is ascertained by the control device, and then via the switching device, a regulated initial supply of current to the phase windings of the stator is effected, while after the predetermined minimum value of the rotor rpm is attained, the control device receives position signals as rotor position signals for a self-commutation of the motor, which signals are derived directly from the third and/or further odd-numbered harmonics of the phase voltages, and from these position signals furnishes control signals to the switching device for supplying current to the phase windings in normal operation, wherein rotor standstill, employing the control device to apply current pulses to the phase windings of the stator and, ascertains the resting position of the rotor from the current rise in the individual windings, and further comprising driving the third and/or the further odd-numbered harmonics of the phase voltages of the stator, on the one hand via the star point of the phase windings and on the other via an auxiliary star point, formed of three phase resistors, to a comparator with a downstream integrator.

8. A method for starting a sensorless, electronically commutatable direct current motor, having a permanent-magnetically excited rotor and a stator that carries a multi-phase, in particular three-phase stator winding, as well as having a switching device, controlled by a control device, for supplying current in the correct order to the phase windings of the stator from a direct voltage source, the method comprising at rotor standstill and at the onset of the startup operation in the range below a minimum value of the rotor rpm, first the position of the rotor is ascertained by the control device, and then via the switching device, a regulated initial supply of current to the phase windings of the stator is effected, while after the predetermined minimum value of the rotor rpm is attained, the control device receives position signals as rotor position signals for a self-commutation of the motor, which signals are derived directly from the third and/or further odd-numbered harmonics of the phase voltages, and from these position signals furnishes control signals to the switching device for supplying current to the phase windings in normal operation, wherein the duration and/or the amount of the initial supply of current to the phase windings of die stator is adapted to the load on the motor at the time, and further comprising driving the third and/or the further odd-numbered harmonics of the phase voltages of the stator, on the one hand via the star point of the phase windings and on the other via an auxiliary star point, formed of three phase resistors, to a comparator with a downstream integrator.

9. A method for starting a sensorless, electronically commutatable direct current motor, having a permanent-magnetically excited rotor and a stator that carries a multi-phase, in particular three-phase stator winding, as well as having a switching device, controlled by a control device, for supplying current in the correct order to the phase windings of the stator from a direct voltage source, the method comprising at rotor standstill and at the onset of the startup operation in the range below a minimum value of the rotor rpm, first the position of the rotor is ascertained by the control device, and then via the switching device, a regulated initial supply of current to the phase windings of the stator is effected, while after the predetermined minimum value of the rotor rpm is attained, the control device receives position signals as rotor position signals for a self-commutation of the motor, which signals are derived directly from the third and/or further odd-numbered harmonics of the phase voltages, and front these position signals furnishes control signals to the switching device for supplying current to the phase windings in normal operation, wherein the control device has a microcontroller, which as input signals receives the signals of an A/D converter, a comparator with hysteresis, and a rated rpm signal, and with its outputs, via a driver stage, it controls a switching device for supplying current to the phase windings of the stator.

10. The method as defined by claim 9, wherein the control device, once the predetermined minimum value of the rotor rpm is attained, continuously receives binary position signals for the rotor-position-dependent self-commutation of the motor via the comparator with hysteresis.

11. A method for starting a sensorless, electronically commutatable direct current motor, having a permanent-magnetically excited rotor and a stator that carries a multi-phase, in particular three-phase stator winding, as well as having a switching device, controlled by a control device, for supplying current in the correct order to the phase windings of the stator from a direct voltage source, the method comprising at rotor standstill and at the onset of the startup operation in the range below a minimum value of the rotor rpm, first the position of the rotor is ascertained by the control device, and then via the switching device, a regulated initial supply of current to the phase windings of the stator is effected, while after the predetermined minimum value of the rotor rpm is attained, the control device receives position signals as rotor position signals for a self-commutation of the motor, which signals are derived directly from the third and/or further odd-numbered harmonics of the phase voltages, and from these position signals furnishes control signals to the switching device for supplying current to the phase windings in normal operation, wherein the control device, once the predetermined minimum value of the rotor rpm is attained, continuously receives binary position signals for the rotor-position-dependent self commutation of the motor via the comparator with hysteresis.

12. A method for starting a sensorless, electronically commutatable direct current motor, having a permanent-magnetically excited rotor and a stator that carries a multi-phase, in particular three-phase stator winding, as well as having a switching device, controlled by a control device, for supplying current in the correct order to the phase windings of the stator from a direct voltage source, the method comprising at rotor standstill and at the onset of the startup operation in the range below a minimum value of the rotor rpm, first the position of the rotor is ascertained by the control device, and then via the switching device, a regulated initial supply of current to the phase windings of the stator is effected, while after the predetermined minimum value of the rotor rpm is attained, the control device receives position signals as rotor position signals for a self-commutation of the motor, which signals are derived directly from the third and/or further odd-numbered harmonics of the phase voltages, and from these position signals furnishes control signals to the switching device for supplying current to the phase windings in normal operation, wherein beyond a predeterminable value of the analog rotor position signal furnished by the integrator, between its resting value and an approximately sine-wave oscillation, the enabling of the change from the regulated initial supply of current to the phase windings to the commutation regulation by the flanks of the binary output signal of the comparator with hysteresis is effected, corresponding to the course of the third harmonic of the phase voltages.

13. The method as defined by claim 12, wherein the enabling of the change from the regulated initial determination of the phase windings to the regulation by the output signal of the comparator with hysteresis is effected upon the attainment of a first turning point of the output signals of the integrator.

14. A method for starting a sensorless, electronically commutatable direct current motor, having a permanent-magnetically excited rotor and a stator that carries a multi-phase, in particular three-phase stator winding, as well as having a switching device, controlled by a control device, for supplying current in the correct order to the phase windings of the stator from a direct voltage source, the method comprising at rotor standstill and at the onset of the startup operation in the range below a minimum value of the rotor rpm, first the position of the rotor is ascertained by the control device, and then via the switching device, a regulated initial supply of current to the phase windings of the stator is effected, while after the predetermined minimum value of the rotor rpm is attained, the control device receives position signals as rotor position signals for a self-commutation of the motor, which signals are derived directly from the third and/or further odd-numbered harmonics of the phase voltages, and from these position signals furnishes control signals to the switching device for supplying current to the phase windings in normal operation, wherein the duration and/or the amount of the initial supply of current to the phase windings of the stator is adapted to the load on the motor at the time, wherein beyond a predeterminable value of the analog rotor position signal furnished by the integrator, between its resting value and an approximately sine-wave oscillation, the enabling of the change from the regulated initial supply of current to the phase windings to the commutation regulation by the flanks of the binary output signal of the comparator with hysteresis is effected, corresponding to the course of the third harmonic of the phase voltages.

15. A method for starting a sensorless, electronically commutatable direct current motor, having a permanent-magnetically excited rotor and a stator that carries a multi-phase, in particular three-phase stator winding, as well as having a switching device, controlled by a control device, for supplying current in the correct order to the phase windings of the stator from a direct voltage source, the method comprising at rotor standstill and at the onset of the startup operation in the range below a minimum value of the rotor rpm. first the position of the rotor is ascertained by the control device, and then via the switching device, a regulated initial supply of current to the phase windings of the stator is effected, while after the predetermined minimum value of the rotor rpm is attained, the control device receives position signals as rotor position signals for a self-commutation of the motor, which signals are derived directly from the third and/or further odd-numbered harmonics of the phase voltages, and from these position signals furnishes control signals to the switching device for supplying current to the phase windings in normal operation, wherein the enabling of the change from the regulated initial determination of the phase windings to the regulation by the output signal of the comparator with hysteresis is effected upon the attainment of a first turning point of the output signals of the integrator.

16. The method as defined by claim 15, wherein after the standstill position of the rotor is ascertained, at least two phase windings of the stator are supplied with current at a starting value, such that between the axes of the rotor and stator magnetomotive force, an angle of 30° el. to 150° el., and preferably approximately 90° el., results.

* * * * *